United States Patent
Iikawa et al.

(10) Patent No.: US 8,508,873 B2
(45) Date of Patent: Aug. 13, 2013

(54) WATER-RESISTANT STRUCTURE OF A LENS BARREL

(75) Inventors: Makoto Iikawa, Saitama (JP); Yuji Kogure, Saitama (JP); Yuzo Minowa, Saitama (JP); Toshiyuki Irie, Saitama (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 282 days.

(21) Appl. No.: 12/710,385

(22) Filed: Feb. 23, 2010

(65) Prior Publication Data

US 2010/0214679 A1 Aug. 26, 2010

(30) Foreign Application Priority Data

Feb. 23, 2009 (JP) ................................. 2009-039074
Feb. 23, 2009 (JP) ................................. 2009-039075

(51) Int. Cl.
*G02B 7/02* (2006.01)
(52) U.S. Cl.
USPC ......................................................... 359/825
(58) Field of Classification Search
USPC .................................................. 359/822–830
See application file for complete search history.

(56) References Cited

U.S. PATENT DOCUMENTS

| | | | |
|---|---|---|---|
| 6,038,087 A * | 3/2000 | Suzuki et al. | 359/819 |
| 6,122,116 A * | 9/2000 | Uno | 359/826 |
| 6,301,060 B1 | 10/2001 | Watanabe et al. | |
| 2008/0204878 A1 | 8/2008 | Iikawa et al. | |

FOREIGN PATENT DOCUMENTS

| | | |
|---|---|---|
| JP | 9-080588 | 3/1997 |
| JP | 11-337804 | 12/1999 |
| JP | 2000-130456 | 5/2000 |
| JP | 2000-227534 | 8/2000 |
| JP | 2003-202481 | 7/2003 |
| JP | 2003-207705 | 7/2003 |
| JP | 2005-137240 | 6/2005 |
| JP | 2007-047411 | 2/2007 |
| JP | 2008-070568 | 3/2008 |
| JP | 2008-203773 | 9/2008 |

OTHER PUBLICATIONS

English translation of Japan Office action, dated Dec. 18, 2012.
Japan Office action, dated Mar. 5, 2013 along with an english translation thereof.

* cited by examiner

*Primary Examiner* — Scott J Sugarman
*Assistant Examiner* — Vipin Patel
(74) *Attorney, Agent, or Firm* — Greenblum & Bernstein, P.L.C.

(57) ABSTRACT

A water-resistant structure of a lens barrel includes a sealing member that seals an annular gap between inner and outer annular members, wherein the sealing member is positioned in a vicinity of an open end of the outer annular member and is fixed to one of the inner and outer annular members to be slidable on the other of the inner and outer annular members, and a drain groove formed on the inner annular member and positioned alongside the sealing member at a position closer to the open end of the outer annular member than the sealing member. Furthermore, a frictional resistance of a first sealing member produced between a secondary annular member and a manually-rotatable annular members is greater than a frictional resistance of the second sealing member that urges one of two of the manually-rotatable annular members to follow a rotation of the other thereof when rotated.

17 Claims, 8 Drawing Sheets

Fig. 4
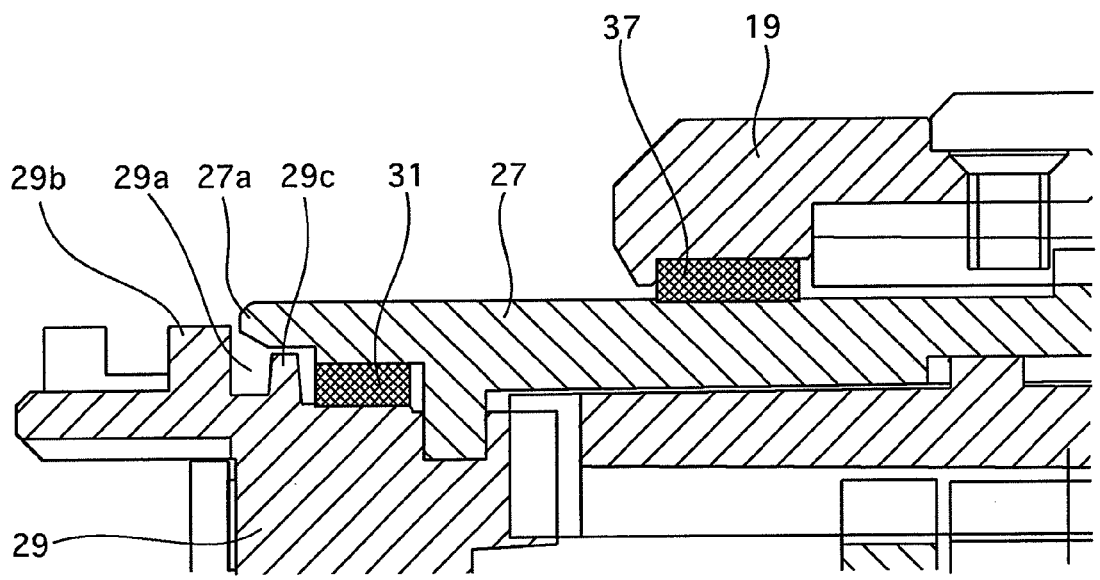
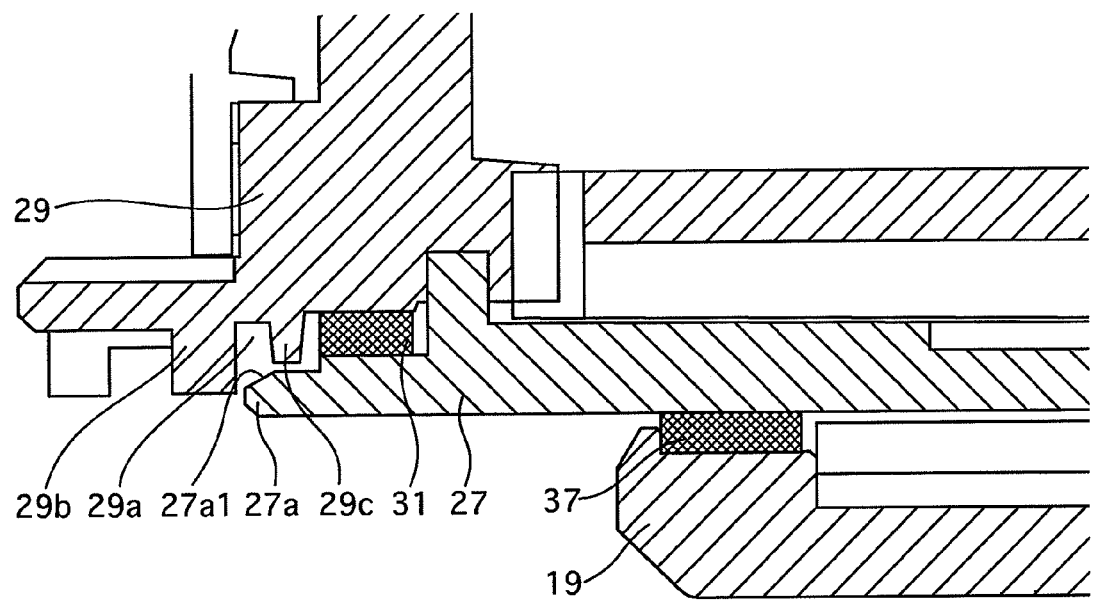

Fig. 6
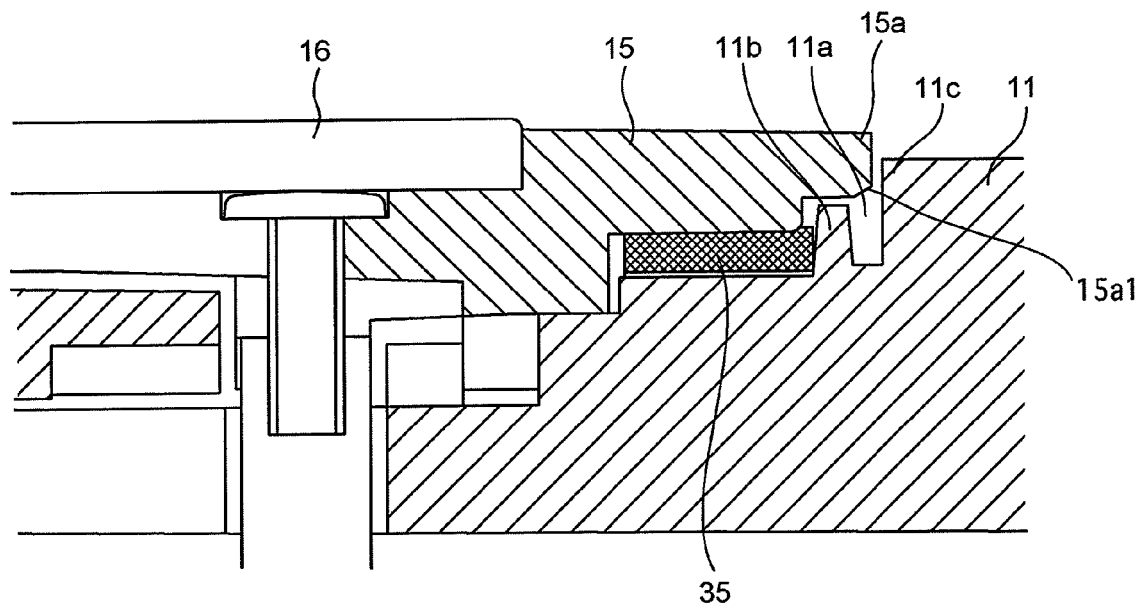
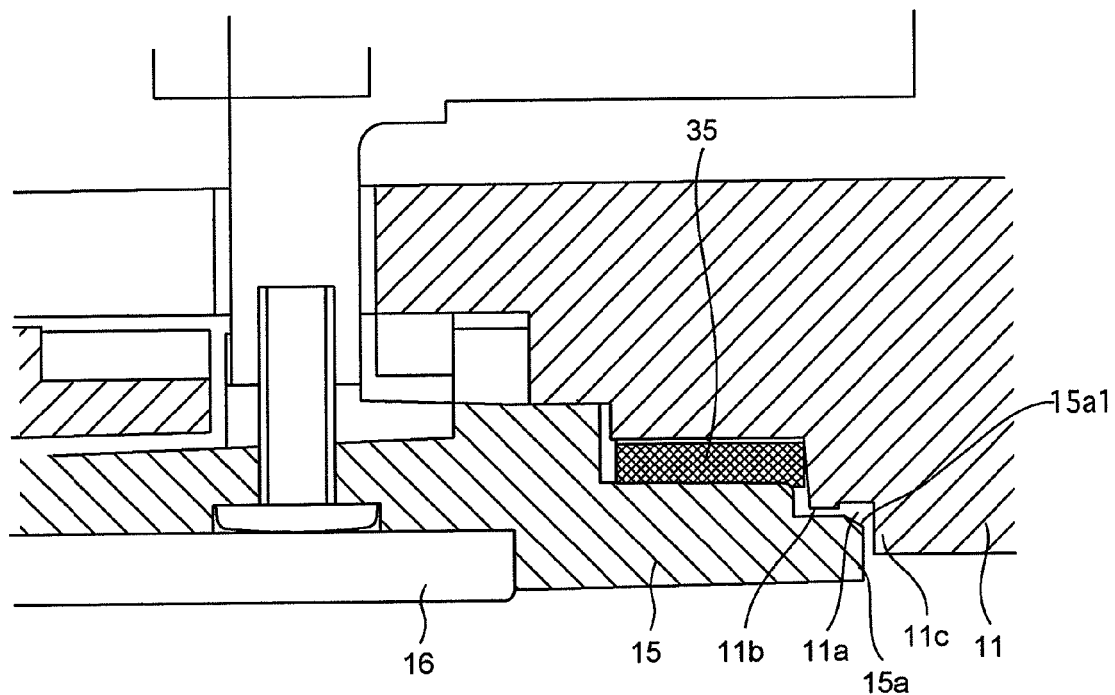

WATER-RESISTANT STRUCTURE OF A LENS BARREL

BACKGROUND OF THE INVENTION

Field of the Invention

The present invention relates to a water-resistant structure provided between concentrically-arranged annular members of a lens barrel.

Lens barrels (e.g., photographic lenses) are generally provided with a plurality of annular members which are concentrically arranged and relatively movable along an optical axis or rotatable about an optical axis. In the case where one of the plurality of annular members is provided as a manually-operated ring (i.e., a zoom ring or a focusing ring) and where another annular ring is configured to move forward/rearward along the optical axis by manually rotating the manually-operated ring, the lens barrel has been conventionally constructed so that the user can feel a moderate resistance in the manually-operated ring when manually rotating the manually-operated ring by intentionally generating a frictional resistance between adjacent (radially overlaid) annular members.

As an example of a device for generating such a frictional resistance, frictional resistance has been generated by fixing one side of an annular synthetic leather, having fine hair implanted on the other side thereof, onto an outer or inner peripheral surface of an annular member while the other side (hair-implanted surface) of the annular synthetic leather is in slidable contact with an inner or outer peripheral surface of an adjacent annular member.

However, in the case of using an annular synthetic leather in such a manner, the user can feel a moderate resistance in the manually-operated ring (zoom ring or focus ring) when manually rotating it, but it becomes difficult to prevent drops of water, dust, and the like, from entering inside the lens barrel through the gap between adjacent ring members (i.e., it is difficult for the lens barrel to exhibit a water-resistant effect).

Lens barrels disclosed in Japanese Unexamined Patent Publication 2000-227534 and Japanese Unexamined Patent Publication 2003-202481 are known in the art as examples of lens barrels which are constructed to allow the user to feel a resistance in a manually-operated ring (zoom ring or focus ring) when the user manually rotates the manually-operated ring while the lens barrel exhibits a water-resistant effect.

In the lens barrel disclosed in Japanese Unexamined Patent Publication 2000-227534, an annular washer made of a plastic or vinyl chloride sheet is inserted in between the rear end of the outer peripheral surface of a front exterior ring and the front end of the inner peripheral surface of a manual ring which is positioned immediately behind the front exterior ring and capable of rotating about an optical axis relative to the front exterior ring (incapable of moving in the optical axis direction relative to the front exterior ring), and another annular washer made of a plastic or vinyl chloride sheet is inserted in between the outer peripheral surface of the rear end of the manual ring and the front end of the inner peripheral surface of a rear exterior ring positioned immediately behind the manual ring. In addition, a water-repellent material is filled in between the rear end of the outer peripheral surface of the front exterior ring and the front end of the inner peripheral surface of the manual ring to be positioned immediately behind the annular washer, while a water-repellent material is also filled in between the rear end of the outer peripheral surface of the manual ring and the front end of the inner peripheral surface of the rear exterior ring to be positioned immediately in front of the annular washer.

In the lens barrel disclosed in Japanese Unexamined Patent Publication 2000-227534 having the above described structure, drops of water and dust on the outside of the lens barrel can be prevented from entering the lens barrel since the annular washers and the front and rear water-repellent materials exhibit water-resistant effects. In addition, since a washer is held between the front exterior ring and the manual ring and also since another washer is held between the manual ring and the rear exterior ring, the user can feel a resistance in the manual ring when manually rotating the manual ring.

In the lens barrel disclosed in Japanese Unexamined Patent Publication 2003-202481, a manually-operated focus ring is provided, on an end surface thereof in an optical axis direction, with a circular groove concentric with the optical axis in which a viscous water repellent or grease is filled, and an exterior ring is provided, on an end surface thereof which faces the focus ring in the optical axis direction, with a circular projection concentric with the optical axis which is loosely engaged in the concentric circular groove.

With such a structure, the gap between the outer exterior ring and the focus ring is sealed by grease so that drops of water, dust, and the like, can be prevented from entering the lens barrel from the outside thereof through the gap, and the operational torque (resistance) of the focus ring can be changed by selecting from among different types of greases having different viscosities.

However, in the lens barrel disclosed in Japanese Unexamined Patent Publication 2000-227534, an annular washer is formed using a plastic sheet or a vinyl chloride sheet that is a relatively hard material, and accordingly, it is difficult to create a resistance like that created when a synthetic leather is used. In particular, in the case where an annular member rotates about an optical axis while sliding in the optical axis direction, it is even more difficult to create a resistance like that created when a synthetic leather is used as compared with the case where an annular member solely slides in an optical axis direction or solely rotates about an optical axis. In addition, if minute projections and depressions exist on the surface of the washer, there is a possibility of the manual rotation operation of the manual ring becoming unsmooth due to the effects of such projections and depressions since each washer is made of a plastic or vinyl chloride sheet. In this manner, each washer needs to be precisely formed according to a designated shape; however, it is difficult to make each washer out of a plastic or vinyl chloride sheet with such precision.

In the lens barrel disclosed in Japanese Unexamined Patent Publication 2003-202481, since the gap between the focus ring and the exterior ring is made watertight by the circular projection that is formed on an end surface of the exterior ring in the optical axis direction and the grease filled in the aforementioned circular groove that is formed on an end surface of the focus ring in the optical axis direction, this type of watertight structure using a circular projection, a circular groove and grease cannot be adopted if the diameters of the exterior ring and the focus ring are not substantially the same.

Additionally, such a structure, since the resistance (operational torque) varies while the water-resistant effect varies according to the strength of the pressure for holding a light shielding member between two barrels, the water-resistant effect becomes too small if the pressure is weakened to reduce the resistance, or the resistance becomes too great if the pressure is conversely increased to enhance the water-resistant effect, so that there a problem exists in which it is difficult to adjust the water-resistant performance and the sense of resistance.

SUMMARY OF THE INVENTION

The present invention provides a water-resistant structure of a lens barrel which can exhibit a water-resistant effect while enabling the user to feel a moderate resistance in an annular member of the lens barrel when the user manually rotates the annular member, and which can even be produced in an easy manner.

In addition, the present invention provides a water-resistant structure of a lens barrel which enables the user to feel a moderate resistance when manually operating one of a plurality of manually-rotatable annular members, which are independently and relatively rotatable, while preventing the other manually-rotatable annular members from following the rotation of the manually-operated annular member, and which can even be produced in an easy manner.

According to an aspect of the present invention, a water-resistant structure of a lens barrel is provided, having at least two annular members which are concentrically arranged and relatively rotatable, the water-resistant structure including a sealing member that seals an annular gap between an inner annular member and an outer annular member of the annular members, wherein the sealing member is positioned in a vicinity of an open end of the outer annular member and is fixed to one of the inner and outer annular members to be slidable on the other of the inner and outer annular members; and at least one drain groove formed on the inner annular member and positioned alongside the sealing member at a position closer to the open end of the outer annular member than the sealing member.

It is desirable for a plurality of the drain grooves to be provided at different positions, and for the depth of at least one of the plurality of drain grooves to be different from the depth of another of the plurality of drain grooves.

It is desirable for the drain groove to be defined between a plurality of flanges which project from an outer peripheral surface of the inner annular member.

It is desirable for the outer annular member to include an overhang which overhangs the drain groove.

It is desirable for a surface of the overhang which faces the drain groove to be inclined to widen a gap between the surface of the overhang and the bottom of the drain groove in a direction toward an end of the overhang.

It is desirable for the drain groove to be formed so that an upper portion of the drain groove is smaller in depth than a lower portion of the driven groove when the lens barrel is in a normal position.

It is desirable for the sealing member to be fixed to an outer peripheral surface of the inner annular member so as to be in slidable contact with an inner peripheral surface of the outer annular member.

It is desirable for the sealing member to be an annular sealing member.

The sealing member can be a flocked cloth material or a water-repellent material.

It is desirable for the outer annular member to be one of a zoom ring and a focus ring.

It is desirable for the plurality of annular members include a plurality of manually-rotatable annular members which are independently relatively rotatable; and at least one secondary annular member to which the plurality of manually-rotatable annular members are relatively rotatable. The water-resistant structure includes a first sealing member which seals a gap defined between two of the plurality of manually-rotatable annular members, one of which is fitted on an outer side of the other, the first sealing member being positioned in a vicinity of an open end of the outer of the two manually-rotatable annular members; and a second sealing member which seals a gap defined between one of the plurality of manually-rotatable annular members and the secondary annular member, the second sealing member being positioned in a vicinity of an open end of the outer of the one of the plurality of manually-rotatable annular members and the secondary annular member. A frictional resistance of the second sealing member which is produced between the secondary annular member and the one of the plurality of manually-rotatable annular members is greater than a frictional resistance of the first sealing member that urges one of the two manually-rotatable annular members to follow a rotation of the other of the two manually-rotatable annular members when the other of the two manually-rotatable annular members is rotated.

In an embodiment, a water-resistant structure of a lens barrel is provided, having a plurality of annular members which are concentrically arranged, wherein the plurality of annular members include a plurality of manually-rotatable annular members which are independently relatively rotatable, and at least one secondary annular member to which the plurality of manually-rotatable annular members are relatively rotatable. The water-resistant structure includes a first sealing member which seals a gap defined between two of the plurality of manually-rotatable annular members, one of which is fitted on an outer side of the other, the first sealing member being positioned in a vicinity of an open end of the outer of the two manually-rotatable annular members; and a second sealing member which seals a gap defined between one of the plurality of manually-rotatable annular members and the secondary annular member, the second sealing member being positioned in a vicinity of an open end of the outer of the one of the plurality of manually-rotatable annular members and the secondary annular member. A frictional resistance of the second sealing member which is produced between the secondary annular member and the one of the plurality of manually-rotatable annular members is greater than a frictional resistance of the first sealing member that urges one of the two manually-rotatable annular members to follow a rotation of the other of the two manually-rotatable annular members when the other of the two manually-rotatable annular members is rotated.

It is desirable for the first sealing member to be positioned between the two of the plurality of manually-rotatable annular members, which are independently relatively rotatable, and for the second sealing member to include at least two sealing members positioned between the secondary annular member and the plurality of manually-rotatable annular members. A frictional resistance of the first sealing member that is produced between the two of the plurality of manually-rotatable annular members is smaller than a frictional resistance of the second sealing member that is produced between the secondary annular member and the plurality of manually-rotatable annular members.

It is desirable for at least one drain groove to be formed on an inner manually-rotatable annular member of the two of the plurality of manually-rotatable annular members, and for the drain groove to be positioned alongside the first sealing member at a position closer to the outside of the inner manually-rotatable annular member than the first sealing member in an axial direction of the inner annular member.

It is desirable for the drain groove to be formed between two flanges which project from an outer peripheral surface of the inner manually-rotatable annular member.

It is desirable for an outer manually-rotatable annular member of the two of the plurality of manually-rotatable annular members to include an overhang which overhangs the drain groove.

According to the present invention, drops of water on the lens barrel enter the drain groove, thus being difficult to reach the sealing member through the inner annular member, so that a high water-resistant effect is achieved. In addition, the resistance caused by the sealing member that the user can feel can be easily set (adjusted) as desired because the degree of dependence on the water-resistant effect by the sealing member is low.

Furthermore, according to the present invention, a water-resistant structure of a lens barrel can be achieved in which, when the user manually rotates one of a plurality of manually-rotatable annular members which are independently relatively rotatable, no other manually-rotatable annular members follow the rotation of the manually-operated manually-rotatable annular member. Since the degree of dependence on the water-resistant effect by the sealing member is low, adjustment of the rotational resistance caused by the sealing member becomes easy, and the ease of rotation and the independency of the plurality of manually-rotatable annular members are facilitated.

The present disclosure relates to subject matter contained in Japanese Patent Applications Nos. 2009-39074 and 2009-39075 (both filed on Feb. 23, 2009) which are expressly incorporated herein by reference in their entireties.

BRIEF DESCRIPTION OF THE DRAWINGS

The present invention will be described below in detail with reference to the accompanying drawings in which:

FIG. 4 is a longitudinal sectional view of a portion of the zoom lens barrel, showing a water-resistant structure thereof in an enlarged view;

FIG. 6 is a longitudinal sectional view of a portion of the zoom lens barrel, showing the water-resistant structure in an enlarged view;

FIGS. 8A, 8B and 8C are longitudinal sectional views of portions of the zoom lens barrel to which another embodiment of the water-resistant structure according to the present invention is applied, in which the drain groove closest to the front end of the zoom lens barrel is different in depth from the drain groove closest to the rear end (lens mount) of the zoom lens barrel, wherein FIG. 8A shows a front end of the zoom lens barrel in an enlarged view, FIG. 8B shows a middle portion of the zoom lens barrel in an enlarged view, and FIG. 8C shows a rear end (lens mount) of the zoom lens barrel thereof in an enlarged view.

DESCRIPTION OF THE PREFERRED EMBODIMENTS

Figure 1:
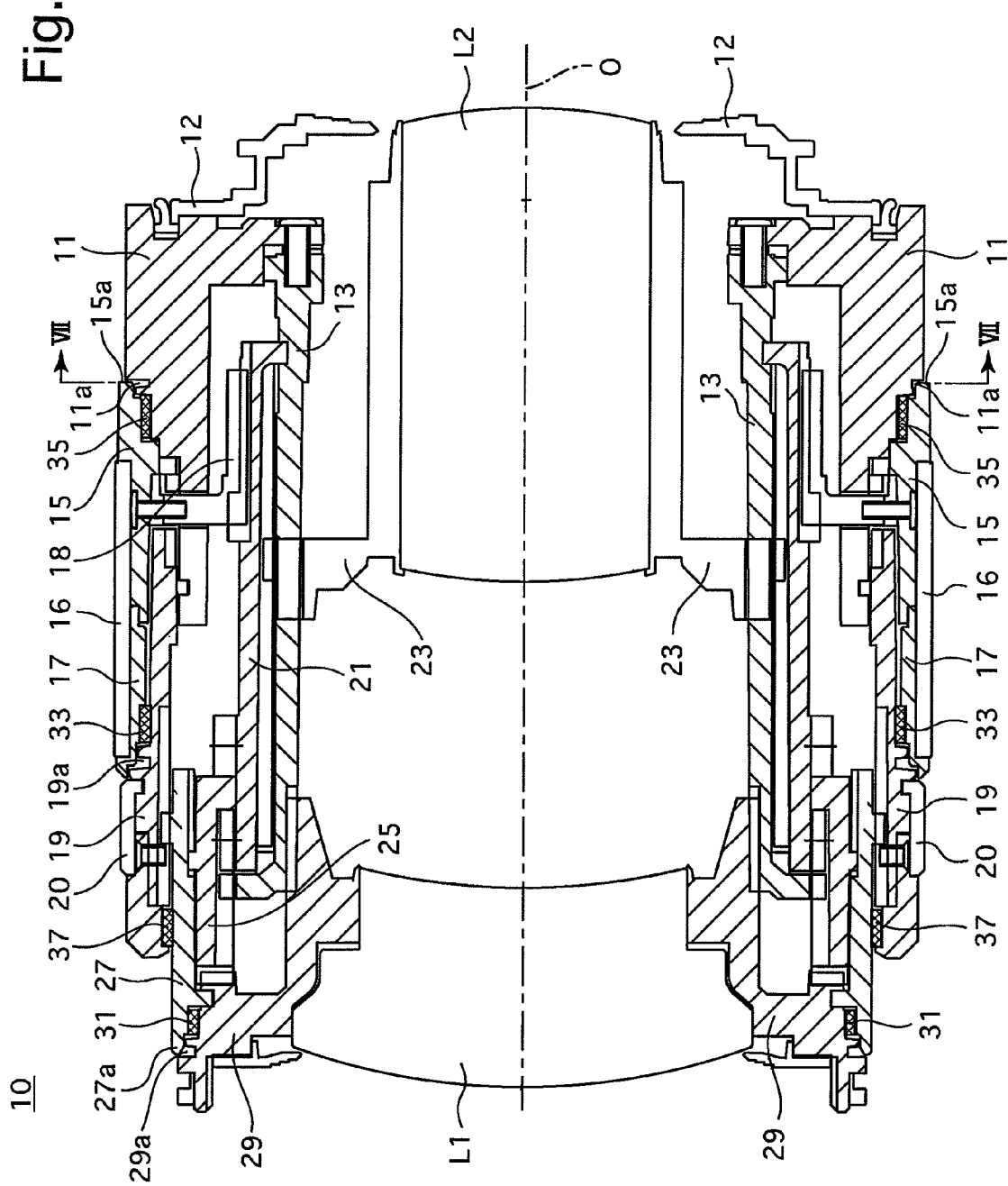
FIG. 1 is a longitudinal sectional view of a zoom lens barrel to which an embodiment of a water-resistant structure according to the present invention is applied, taken along a plane passing through an optical axis.

FIG. 1 is a longitudinal sectional view of a zoom lens barrel (zoom lens) 10 to which an embodiment of a water-resistant structure according to the present invention is applied, taken along a plane passing through an optical axis O.

The lens barrel 10 is an interchangeable type of zoom lens barrel having two lens groups L1 and L2. The lens barrel 10 is provided, at the rear end of a first stationary barrel (secondary annular member) 11 having a cylindrical shape about the optical axis O of each lens group L1 and L2, with a lens mount 12 which is detachably attached to the body mount of a camera body (not shown). The lens barrel 10 is further provided inside the first stationary barrel 11 with a second stationary barrel 13 having a cylindrical shape concentric with the first stationary barrel 11. The rear end of the second stationary barrel 13 is fixed to a front surface of a rear wall of the first stationary barrel 11.

The lens barrel 10 is provided on the front end of the first stationary barrel 11 with a manually-operated zoom ring (rear zoom ring) 15 having a cylindrical shape concentric with the first stationary barrel 11 and the second stationary barrel 13, and the zoom ring 15 is mounted to the front end of the first stationary barrel 11 to be rotatable about the optical axis O (but non-slidable in the optical axis direction). The lens barrel 10 is provided immediately in front of the zoom ring 15 with a manually-operated zoom ring (front zoom ring) 17 which is coupled to the front end of the zoom ring 15 so as to rotate integrally therewith. In other words, a zoom ring 30 is divided into two components: the front zoom ring 17 and the rear zoom ring 15 that are coupled to each other so as to rotate as a single zoom ring about the optical axis O. A grip ring 16 is fixed onto the outer peripheral surfaces of the front zoom ring 17 and the rear zoom ring 15 (zoom ring 30). The zoom ring 30 constitutes a manually-rotatable annular member of a plurality of manually-rotatable annular members of the lens barrel 10. The first stationary barrel 11 constitutes a single annular member to which the manually-rotatable annular member (zoom ring 30) relatively rotates.

The lens barrel 10 is provided with a manually-operated focus ring 19 having a cylindrical shape concentric with the first stationary barrel 11. A non-slip ring 20 is fitted onto the periphery of the manually-operated focus ring 19. The rear end of the focus ring 19 is fitted on the front end of the outer peripheral surface of the first stationary barrel 11 to be rotatable about the optical axis O while being prevented from moving in the optical axis direction relative to the first stationary barrel 11. The rear end of the focus ring 19 is positioned radially inside the zoom rings 15 and 17. The focus ring 19 is provided on an inner peripheral surface of the rear end thereof with a circumferential gear (not shown) which is engaged with an output gear (not shown) which is rotatably supported in the vicinity of the front end of the outer peripheral surface of the second stationary barrel 13. Upon the lens barrel 10 being attached to a camera body, this output gear is connected to a focusing motor incorporated in the camera body via a gear mechanism provided in the camera body. The focus ring 19 constitutes one of the plurality of the manually-rotatable annular members, and also serves as an inner manually-rotatable annular member that is positioned radially inside the zoom rings 15 and 17.

The lens barrel 10 is provided radially outside the second stationary barrel 13 with a cam ring 21 having a cylindrical shape concentric with the second stationary barrel 13. The cam ring 21 is supported by the second stationary barrel 13 to be freely rotatable about the optical axis O without moving in the optical axis direction relative to the second stationary barrel 13. In addition, the cam ring 21 is connected with the zoom ring 15 via a zoom linkage lever 18. Therefore, a rotation of the zoom ring 15 causes the cam ring 21 to rotate about the optical axis O without moving in the optical axis direction.

The second stationary barrel 13 supports a second lens group support frame 23 positioned radially inside the cam ring 21. The second lens group support frame 23 is a member which supports the second lens group L2 that serves as a variator lens group. The second lens group support frame 23 is guided linearly in the optical axis direction by linear guide grooves (not shown) formed on the second stationary barrel 13 and is engaged with cam grooves formed on an inner peripheral surface of the cam ring 21. Therefore, rotating the cam ring 21 via the zoom ring 15 causes the second lens group support frame 23 to move forward/rearward along the optical axis O without rotating about the optical axis O at a speed determined according to the lead of the cam grooves of the cam ring 21.

The lens barrel 10 is provided on the outer peripheral surface of the front end of the cam ring 21 with a linearly movable ring 25 having a cylindrical shape concentric with the cam ring 21. Although not discussed in detail, the linearly movable ring 25 is supported by the second stationary barrel 13 to be freely movable forwardly and rearwardly along the optical axis O without rotating, and is connected with the cam ring 21 so that a rotation of the cam ring 21 causes the linearly movable ring 25 to move forward/rearward along the optical axis O without rotating via a cam mechanism provided between the linearly movable ring 25 and the cam ring 21.

The lens barrel 10 is provided between the linearly movable ring 25 and the focus ring 19 with a rotatable advancing ring (secondary annular member) 27 having a cylindrical shape concentric with the linearly movable ring 25 and the focus ring 19. Although not discussed in detail, the rotatable advancing ring 27 is connected with the linearly movable ring 25 via a helicoid mechanism, and is connected with the focus ring 19 to be freely movable forwardly rearwardly along the optical axis O relative to the focus ring 19 and to be rotatable with the focus ring 19 about the optical axis O. Therefore, a rotation of the cam ring 21 causes the rotatable advancing ring 27 to move forward/rearward with the linearly movable ring 25, which moves forward/rearward along the optical axis O via the aforementioned cam mechanism provided between the linearly movable ring 25 and the cam ring 21, along the optical axis O without rotating. On the other hand, a rotation of the focus ring 19 causes the rotatable advancing ring 27 to move forward/rearward along the optical axis O via the helicoid mechanism provided between the rotatable advancing ring 27 and the linearly movable ring 25 while rotating with the focus ring 19. The rotatable advancing ring 27 constitutes an annular member to which the aforementioned manually-rotatable annular members rotate relatively.

Figure 2:
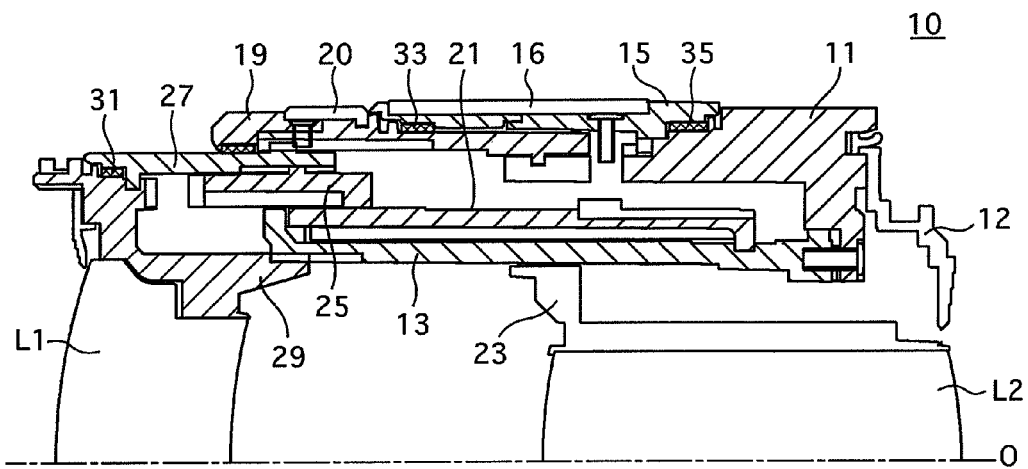
FIG. 2 is a longitudinal sectional view of the zoom lens barrel taken along a plane passing through the optical axis, showing only an upper half of the zoom lens barrel from the optical axis in a state where the zoom lens is focused at a minimum distance.

The lens barrel 10 is provided immediately inside the rotatable advancing ring 27 with a first lens group support frame 29 having a cylindrical shape which supports the first lens group L1. The rear end of the first lens group support frame 29 is connected into the front end of the second stationary barrel 13 in a manner to be freely movable forward/rearward linearly in the optical axis direction without rotating relative to the second stationary barrel 13. The first lens group L1 serves as a compensator lens and a focusing lens. The outer periphery of the front end of the first lens group support frame 29 is connected to the rotatable advancing ring 27 in a manner to be freely rotatable about the optical axis O relative to the rotatable advancing ring 27 and to be movable with the rotatable advancing ring 27 in the optical axis direction. Therefore, manually rotating the focus ring 19 causes the rotatable advancing ring 27 to move forward/rearward in the optical axis direction while rotating, and this forward/rearward movement causes the first lens group support frame 29 that supports the first lens group L1 to move forward/rearward along the optical axis O without rotating. On the other hand, manually rotating the zoom ring 15 causes the first lens group support frame 29, which is prevented from rotating, to move forward/rearward in the optical axis direction relative to the second stationary barrel 13 and the focus ring 19 by the linearly movable ring 25 and the rotatable advancing ring 27. FIG. 2 shows a state where the rotatable advancing ring 27, the first lens group support frame 29 and the first lens group L1 have been fully advanced via rotation of the focus ring 19.

Therefore, the rotatable advancing ring 27 moves forward/rearward without rotating when the linearly movable ring 25 moves linearly in the optical axis direction by a rotation of the cam ring 21, and the rotatable advancing ring 27 moves forward/rearward while rotating when the focus ring 19 rotates.

Figure 3:
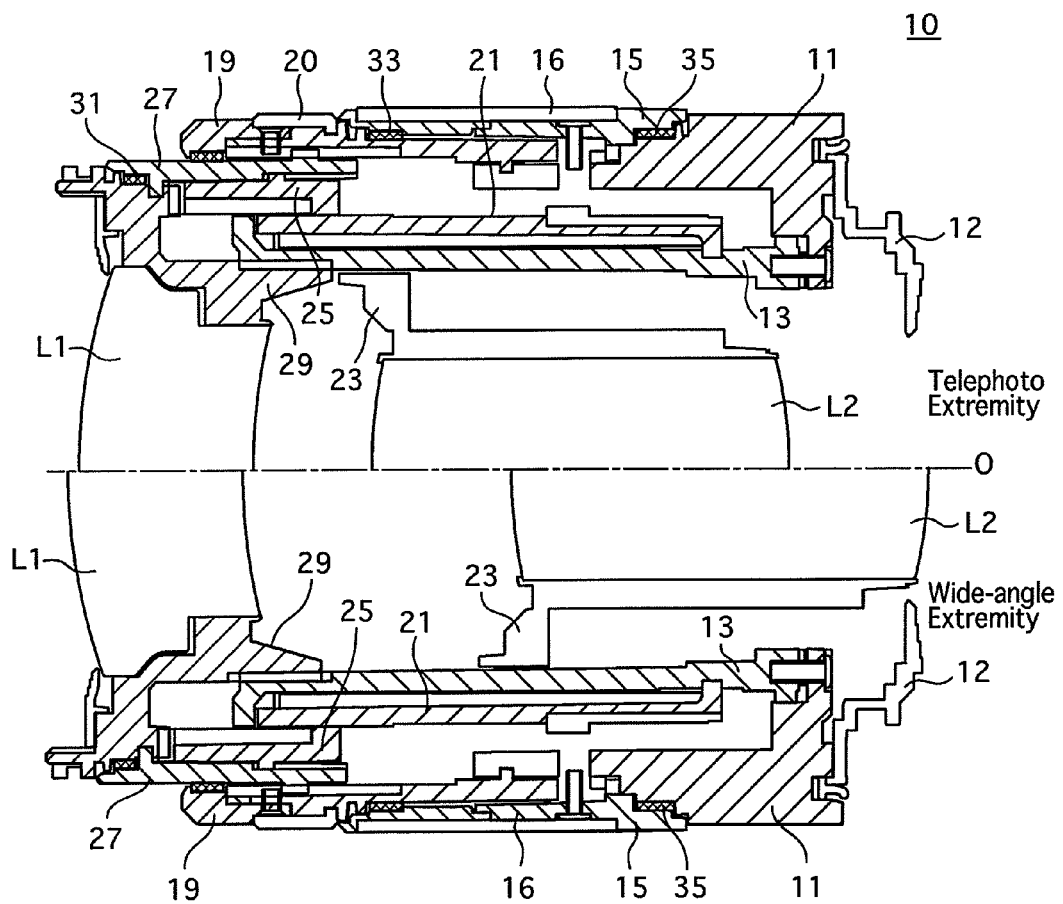
FIG. 3 is a longitudinal sectional view of the zoom lens barrel taken along a plane passing through the optical axis, wherein an upper half and a lower half of the zoom lens barrel from the optical axis show the zoom lens barrel at the telephoto extremity and the wide-angle extremity of the zooming range, respectively.

A rotation of the cam ring 21 causes the second lens group support frame 23 that supports the second lens group L2 to move forward/rearward in the optical axis direction without rotating along the aforementioned linear guide grooves (not shown) formed on the second stationary barrel 13 due to the lead of a cam mechanism provided between the cam ring 21 and the second lens group support frame 23, and also causes the first lens group support frame 29 that holds the first lens group L1 to move forward/rearward without rotating to thereby carry out a zooming operation due to the aforementioned cam mechanism provided between the linearly movable ring 25 and the cam ring 21 (see FIG. 3).

Water-resistant structures provided between the rotatable advancing ring 27 and the first lens group support frame 29, between the front zoom ring 17 and the focus ring 19, and between the rear zoom ring 15 and the first stationary barrel 11 will be hereinafter discussed with reference further to FIGS. 4 through 7.

FIG. 4 is a longitudinal sectional view of a portion of the lens barrel 10, showing the water-resistant structure provided between the rotatable advancing ring 27 and the first lens group support frame 29 in an enlarged view. A flocked cloth 31 serving as a sealing member is installed in a gap (annular gap) defined between an inner peripheral surface of a front part of the rotatable advancing ring 27 and an outer peripheral surface of the first lens group support frame 29. The flocked cloth 31 is shaped into a ring, and the inner peripheral surface (adhesive surface) of the flocked cloth 31 is bonded to an outer peripheral surface of the first lens group support frame 29, while the outer peripheral surface (flocked surface) of the flocked cloth 31 is in contact with the rotatable advancing ring 27 to be freely slidable thereon. However, the flocked cloth 31 can be installed between the first lens group support frame 29 and the rotatable advancing ring 27 in a reversed fashion. Namely, it is possible that the outer peripheral surface of the flocked cloth 31 be bonded to the rotatable advancing ring 27 while the inner peripheral surface of the flocked cloth 31 be in contact with an outer peripheral surface of the first lens group support frame 29 to be freely slidable thereon. In addition, the sealing member is not limited solely to a flocked cloth and can be any other ring-shaped sealing member such as synthetic leather having a flocked surface over one side thereof. Furthermore, a water-repellent material or a surface having a water-repellent finish can be used as a sealing member.

The first lens group support frame 29 is provided, on an outer peripheral surface thereof at a position closer to the outside (left side with respect to FIG. 4) of the lens barrel 10 than the flocked cloth 31 (more specifically, at a position slightly away from the position of the front end surface of the flocked cloth 31 in the optical axis direction), with a drain groove 29a defined by a front flange 29b and a rear flange 29c therebetween. The front flange 29b and the rear flange 29c are formed circumferentially around the first lens group support frame 29, i.e., the drain groove 29a is formed circumferentially around the first lens group support frame 29. The front flange 29b is greater in radial height than the rear flange 29c.

The rotatable advancing ring 27 is provided at the front end thereof with an overhang (ring-shaped overhang) 27a which covers the drain groove 29a. The overhang 27a extends forward to cover the drain groove 29a beyond the outer peripheral surface of the rear flange 29c, to a position where a slight gap remains between the front end of the overhang 27a and the front flange 29b. In addition, the overhang 27a is provided on a surface thereof facing the drain groove 29a with a tapered portion 27a1 which tapers rearwardly so that the distance between the tapered portion 27a1 and the bottom of the drain groove 29a increases in the forward direction, toward the front end of the overhang 27a.

Since the drain groove 29a with the overhang 27a is provided alongside (left side with respect to FIG. 4) the flocked cloth 31, drops of water splashed onto the lens barrel 10 enter into the drain groove 29a through the gap formed between the overhang 27a and the front flange 29b; however, such drops of water run downwardly in the direction of gravity along the drain groove 29a to drain out of the drain groove 29a through the gap formed between the overhang 27a and the front flange 29b. Namely, when drops of water are splashed onto the lens barrel 10 with the camera body held normally (horizontally), some of the drops of water drain down and out of the lens barrel 10 via the drain groove 29a. In addition, in the present embodiment of the water-resistant structure, the tapered portion 27a1 of the overhang 27a is inclined downwardly in the direction toward the gap formed between the tapered portion 27a1 and the front flange 29b, which enhances the drainage performance.

Even if drops of water from the drain groove 29a were to enter through the gap between the outer peripheral surface of the rear flange 29c and the overhang 27a and enter into the groove between the rear flange 29c and the flocked cloth 31, such drops of water would run down this groove in the direction of gravity and drain out at the lower end through the gap formed between the rear flange 29c and the overhang 27a.

Figure 5:
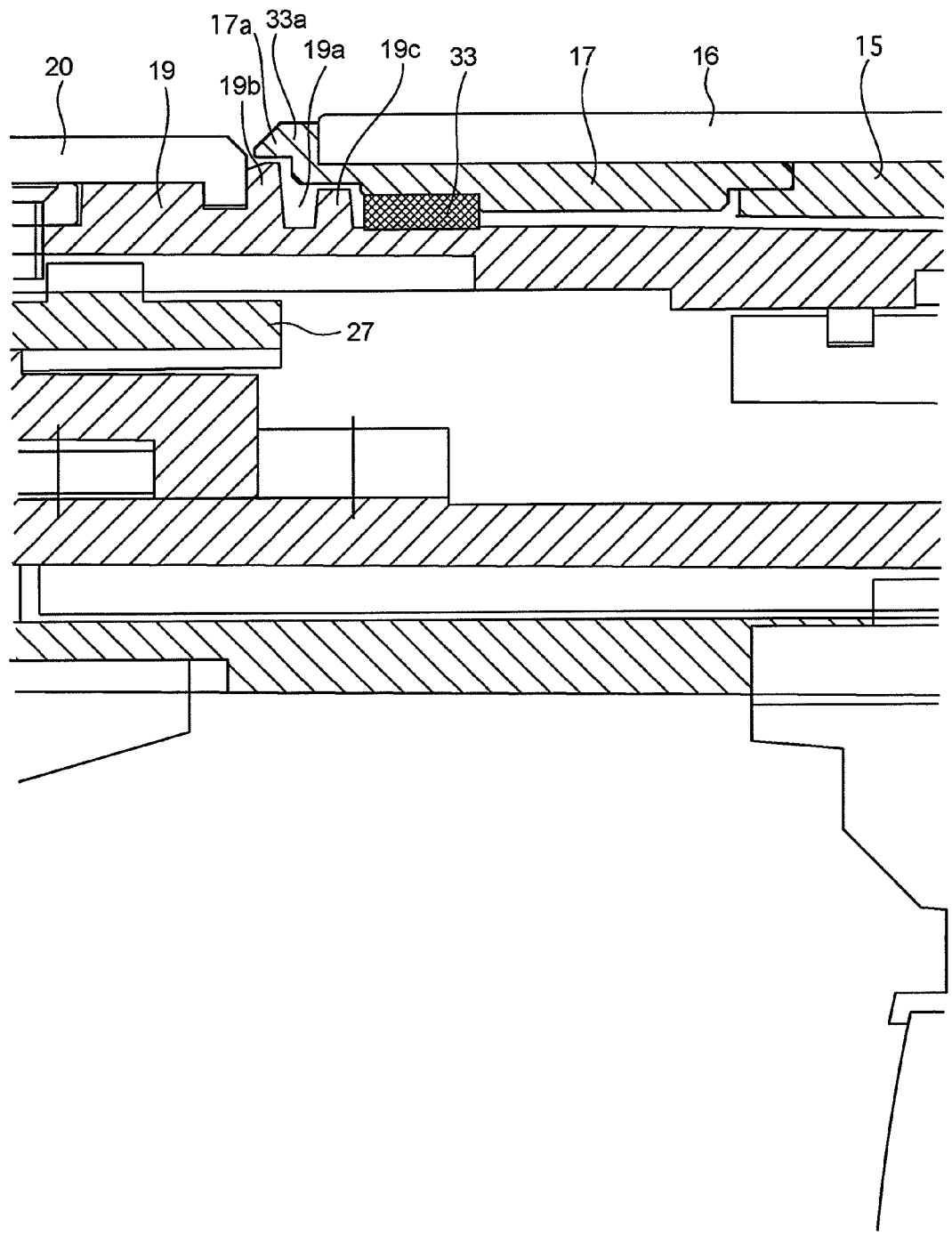
FIG. 5 is a longitudinal sectional view of a portion of the zoom lens barrel, showing an upper half of the water-resistant structure from the optical axis in an enlarged view.

FIG. 5 is a longitudinal sectional view of a portion of the lens barrel 10, showing the water-resistant structure between the front zoom ring 17 and the focus ring 19 in an enlarged view. A flocked cloth 33 serving as a sealing member is installed in a gap (annular gap) defined between the inner peripheral surface of a portion of the front zoom ring 17 in the vicinity of the front end thereof and an outer peripheral surface of the focus ring 19. Although the inner peripheral surface (adhesive surface) of the flocked cloth 33 is bonded to an outer peripheral surface of the focus ring 19, while the outer peripheral surface (flocked surface) of the flocked cloth 33 is in contact with an inner peripheral surface of the front zoom ring 17 to be freely slidable thereon, the flocked cloth 33 can be installed between the front zoom ring 17 and the focus ring 19 in a reversed fashion. Namely, it is possible that the outer peripheral surface of the flocked cloth 33 be bonded to an inner peripheral surface of the front zoom ring 17 while the inner peripheral surface of the flocked cloth 33 be in contact with the focus ring 19 to be freely slidable thereon.

The focus ring 19 is provided on an outer peripheral surface thereof in front of the flocked cloth 33 at a position closer to the outside (left side with respect to FIG. 5) of the lens barrel (zoom lens) 10 than the flocked cloth 33 (more specifically, at a position slightly away from the position of the front end surface of the flocked cloth 33 in the optical axis direction), with a drain groove 19a defined by a front flange 19b and a rear flange 19c therebetween. The front flange 19b and the rear flange 19c are formed circumferentially around the focus ring 19, i.e., the drain groove 19a is formed circumferentially around the focus ring 19. The front flange 19b is greater in radial height than the rear flange 19c.

The front zoom ring 17 is provided at the front end thereof with an overhang (ring-shaped overhang) 17a which covers the drain groove 19a. The overhang 17a extends forward to cover the drain groove 19a beyond the outer peripheral surface of the rear flange 19c, to a position where a slight gap remains between the front end of the overhang 17a and the outer peripheral surface of the front flange 19b.

Since the drain groove 19a with the overhang 17a is provided alongside (left side with respect to FIG. 5) the flocked cloth 33, drops of water splashed onto the lens barrel 10 enter into the drain groove 19a through the gap formed between the overhang 17a and the front flange 19b; however, such drops of water run downwardly in the direction of gravity along the drain groove 19a to drain down and out of the drain groove 19a through the gap formed between the overhang 17a and the front flange 19b. Namely, when drops of water are splashed onto the lens barrel 10 with the camera body held normally, some of the drops of water drain and out of the lens barrel 10 via the drain groove 19a.

Furthermore, even if drops of water from the drain groove 19a were to enter through the gap between the outer peripheral surface of the rear flange 19c and the inner peripheral surface of the front zoom ring 17 and enter into the groove between the rear flange 19c and the flocked cloth 33, such drops of water would run down this groove in the direction of gravity and drain out at the lower end through the gap formed between the rear flange 19c and the front zoom ring 17.

The gap (annular gap) defined between the front end of the focus ring 19 and the rotatable advancing ring 27 is water-sealed by a flocked cloth 37 serving as a sealing member (see FIG. 4). The outer peripheral surface of the flocked cloth 37 is bonded to an inner peripheral surface of the focus ring 19, while the inner peripheral surface of the flocked cloth 37 is in contact with the rotatable advancing ring 27 to be freely slidable thereon.

FIG. 6 is a longitudinal sectional view of a portion of the lens barrel 10, showing the water-resistant structure provided between the rear zoom ring 15 and the first stationary barrel 11 in an enlarged view. A flocked cloth 35 serving as a sealing member is installed in a gap (annular gap) defined between an inner peripheral surface of the rear end of the rear zoom ring 15 and an outer peripheral surface of the first stationary barrel 11. The inner peripheral surface (adhesive surface) of the flocked cloth 35 is bonded to an outer peripheral surface of the first stationary barrel 11, while the outer peripheral surface (flocked surface) of the flocked cloth 35 is in contact with an inner peripheral surface of the rear zoom ring 15 to be freely slidable thereon. However, the flocked cloth 35 can be installed between the first stationary barrel 11 and the rear zoom ring 15 in a reversed fashion. Namely, it is possible that the inner peripheral surface of the flocked cloth 35 be in contact with an outer peripheral surface of the first stationary barrel 11 to be freely slidable thereon, while the outer peripheral surface of the flocked cloth 35 be bonded to an inner peripheral surface of the rear zoom ring 15.

The first stationary barrel 11 is provided on an outer peripheral surface thereof behind the flocked cloth 35 at a position closer to the outside (right side with respect to FIG. 6) of the lens barrel (zoom lens) 10 than the flocked cloth 35 (more specifically, at a position slightly away from the position of the rear end surface of the flocked cloth 35 in the optical axis direction), with a drain groove 11a defined by a front flange 11b and a rear flange 11c therebetween. The front flange 11b and the rear flange 11c are formed circumferentially around the first stationary barrel 11, i.e., the drain groove 11a is formed circumferentially around the first stationary barrel 11. The front flange 11b is greater in radial height than the rear flange 11c.

The rear zoom ring 15 is provided at the rear end thereof with an overhang (ring-shaped overhang) 15a which covers the drain groove 11a. The overhang 15a extends rearward to cover the drain groove 11a beyond the outer peripheral surface of the front flange 11b, to a position where a slight gap remains between the rear end of the overhang 15a and the rear flange 11c. In addition, the overhang 15a is provided on a surface thereof facing the drain groove 11a with a tapered portion 15a1 which tapers forwardly so that the distance between the tapered portion 15a1 and the bottom of the drain groove 11a increases in the rearward direction, toward the rear end of the overhang 15a.

Since the drain groove 11a having the overhang 15a is provided alongside (right side with respect to FIG. 6) the flocked cloth 35, drops of water splashed onto the lens barrel 10 enter into the drain groove 11a through the gap formed between the overhang 15a and the rear flange 11c; however, such drops of water run downwardly in the direction of gravity along the drain groove 11a to drain down and out of the drain groove 11a through the gap formed between the overhang 15a and the rear flange 11c. Namely, when drops of water are splashed onto the lens barrel 10 with the camera body held normally, some of the drops of water drain down and out of the lens barrel 10 via the drain groove 11a. In addition, the drain groove 11a is formed to decrease in depth in the downward direction as shown in FIG. 7, and the tapered portion 15a1 of the overhang 15a is inclined in a direction to drain the drops of water in the drain groove 11a out of the drain groove 11a (in a direction to increase the gap between the tapered portion 15a1 and the bottom of the drain groove 11a in the rearward direction), which makes the drops of water in the drain groove 11a easy to flow out of the drain groove 11a along the tapered portion 15a1 and thus enhances the drainage performance.

Figure 7:
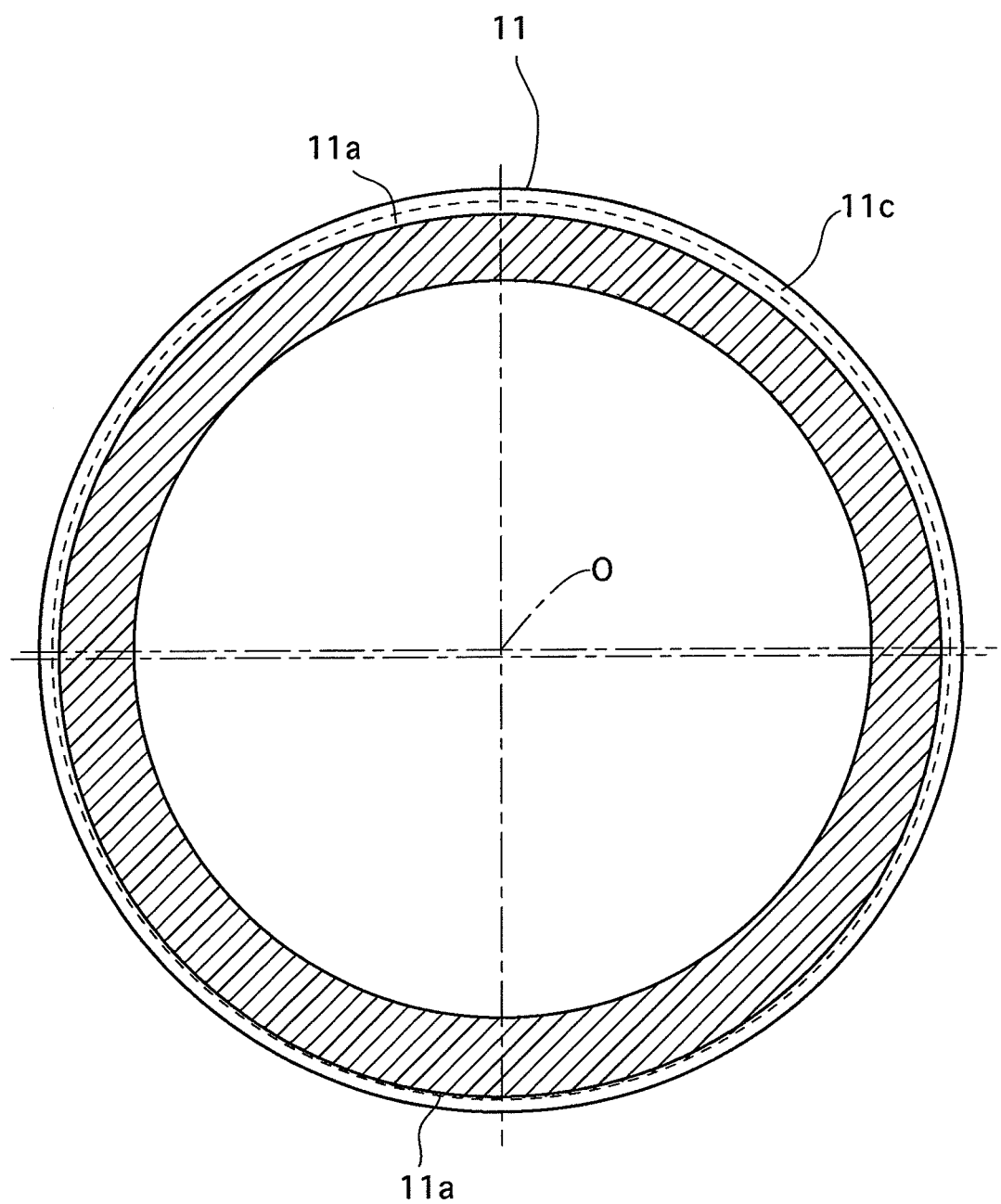
FIG. 7 is a cross sectional view taken along the line VII-VII shown in FIG. 1, showing the shape of a drain groove of the zoom lens barrel.

In addition, the drain groove 11a is formed to increase in depth in the upward direction and to decrease in depth in the downward direction (see FIG. 7). Due to this groove structure in which the depth of the drain groove 11a varies in such a manner, water splashed onto the lens barrel 10, with the camera body held normally, enter into the an upper part of the drain groove 11a and thereafter easily drain down and out of the lens barrel 10 through a lower part of the drain groove 11a.

Furthermore, even if drops of water from the drain groove 11a were to enter through the gap between the outer peripheral surface of the rear flange 11b and the overhang 15a and enter into the groove between the rear flange 11b and the flocked cloth 35, such drops of water would run down this groove in the direction of gravity and drain out at the lower end through the gap formed between the rear flange 11b and the overhang 15a.

As described above, according to the present embodiment of the water-resistant structure, since the drain grooves 29a, 19a and 11a are formed at positions closer to the outside of the lens barrel 10 than the flocked cloths 31, 33 and 35, respectively, the drops of water on the lens barrel 10 which enter into the drain grooves 29a, 19a and 11a flow to the outside of the drain groove 11a along the drain grooves 29a, 19a and 11a from the lowermost parts thereof, respectively, so that the water resistant effect is higher than the case using only sealing members.

According to the water-resistant structure provided with the overhangs 27a, 17a and 15a that cover the drain grooves 29a, 19a and 11a, respectively, drops of water are obstructed by the overhangs 27a, 17a and 15a, thus making it difficult for water to enter the drain grooves 29a, 19a and 11a, respectively, and also drops of water flow down to the outside of the lens barrel 10 via the outer surfaces of the overhangs 27a, 17a and 15a, which further improves the water resistant effect.

Each of the overhangs 27a, 17a and 15a can be shaped so as to either fully cover the associated drain groove (e.g., shaped like the overhang 17a) or partly cover the associated drain groove (e.g., shaped like the overhang 27a or 15a).

Although the tapered portions 27a1 and 15a1 are formed on the overhangs 27a and 15a, respectively, in the above described embodiment of the water-resistant structure, a similar tapered portion can also be formed on the overhang 17a.

As shown in FIG. 6, according to the above described structure of the drain groove 19a in which the depth thereof increases and decreases in the upward direction and the downward direction, respectively, with respect to when the camera body is held normally (horizontally), the drops of water having fallen into the drain groove 19a and flown down through the drain groove 19a easily overflow from the drain groove 19a and drop therefrom out of the lens barrel 10, which further improves the water resistant effect.

Figure 8A:
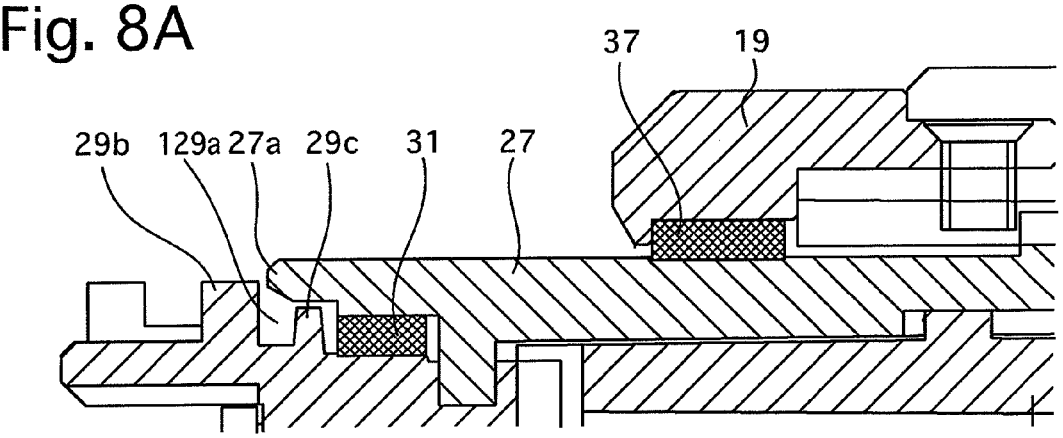
Figure 8B:
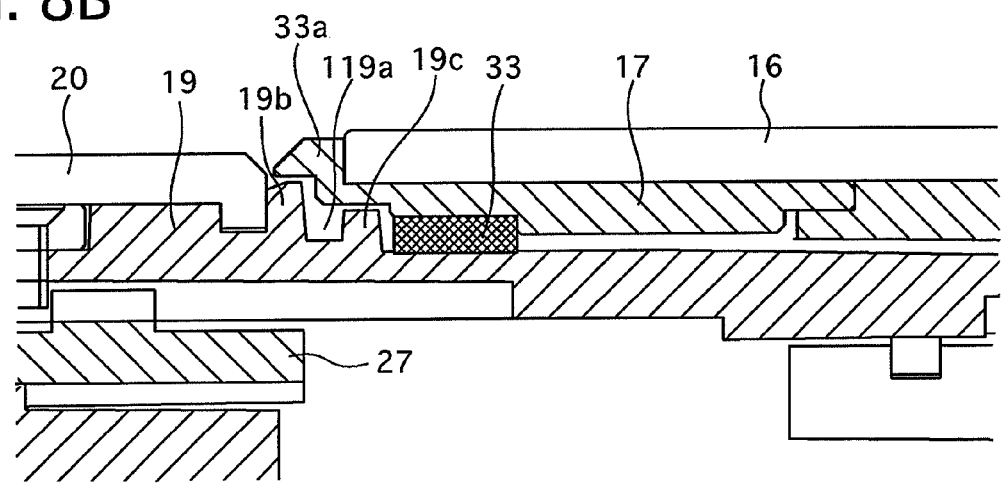
Figure 8C:
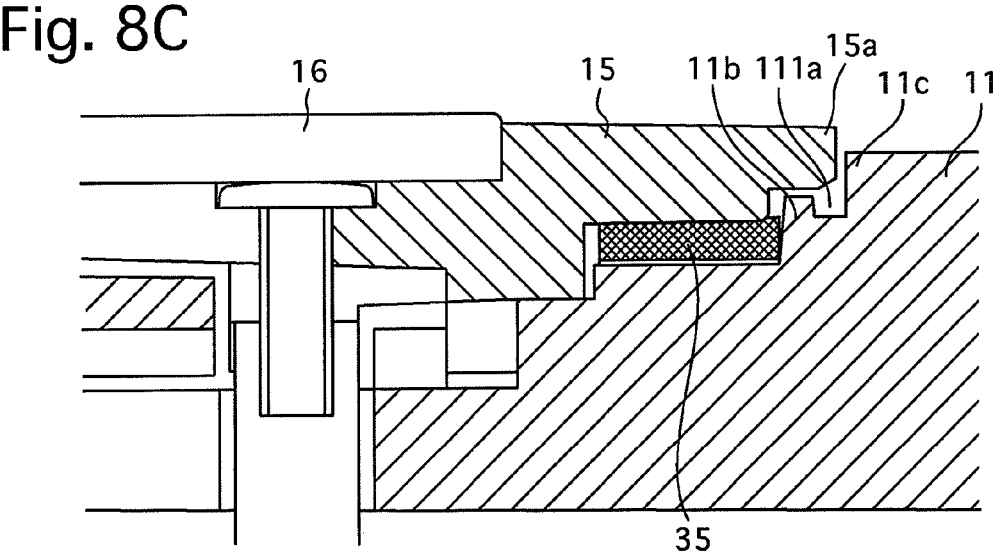

In another embodiment of the water-resistant structure, the depths of drain grooves 129a, 119a and 111a which correspond to the drain grooves 29a. 19a and 11a are formed mutually different in depth. FIGS. 8A, 8B and 8C that respectively correspond to FIGS. 4, 5 and 6 show longitudinal sectional views of this embodiment of the water-resistant structure, in which the drain groove on the object side (front end side of the lens barrel) and the drain groove on the camera body side (the lens mount side) are different in depth from each other. Elements of the lens barrel shown in FIGS. 4, 5 and 6 which are similar to those shown in FIGS. 8A, 8B and 8C are designated by the same reference numerals. In this embodiment, the depths of the drain grooves 129a, 119a and 111a are determined so that the drain groove closer to the object side (front end side of the lens barrel) is greater in depth, i.e., the drain groove closer to the camera body side (the lens mount side) is smaller in depth. Specifically, the depth of the drain groove 129a is the greatest while the depth of the drain groove 111a is the smallest. The closer the drain groove to the front end of the lens barrel 10, the easier for drops of water to flow into the drain groove, and accordingly, the water-resistant effect is enhanced by forming the drain grooves 129a, 119a and 111a so that the depths thereof increase in the direction toward the front end of the lens barrel.

Figure 9:
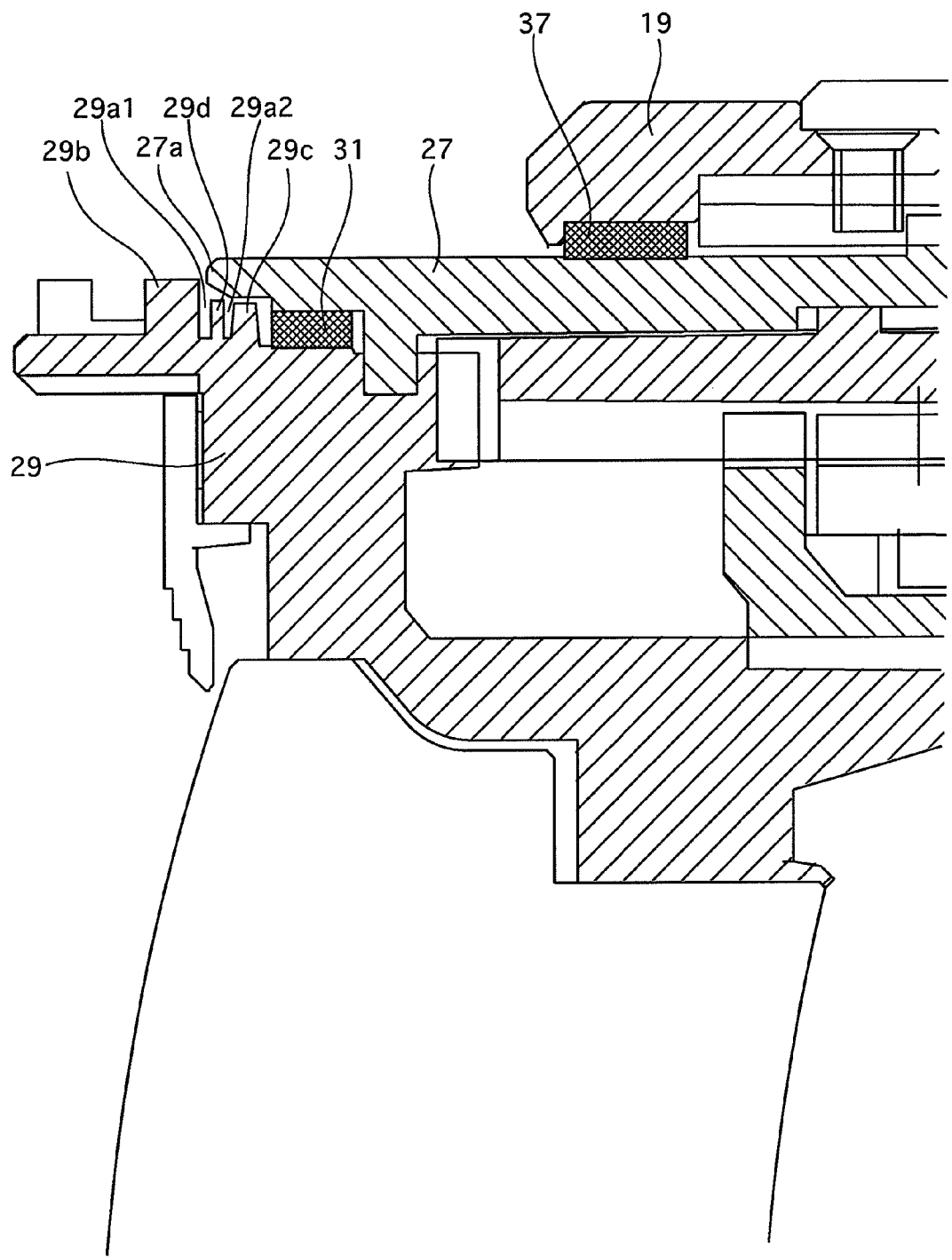
FIG. 9 is a longitudinal sectional view of a portion of the zoom lens barrel to which another embodiment of the water-resistant structure according to the present invention is applied, wherein two drain grooves are formed in the vicinity of the front end of the zoom lens barrel.

In another embodiment of the water-resistant structure, at least one drain groove formed on the lens barrel 10 includes of more than one drain groove. FIG. 9 shows an embodiment of the water-resistant structure in which the drain groove (which corresponds to the drain groove 29a shown in FIG. 4) formed in the vicinity of the front end of the first lens group support frame 29 includes of two drain grooves 29a1 and 29a2. In this embodiment, the first lens group support frame 29 is provided between the flanges 29b and 29c with a third (middle) flange 29d which projects radially outwards from the outer peripheral surface of the first lens group support frame 29 between the flanges 29b and 29c to form the two drain grooves 29a1 and 29a2. The formation of the plurality of drain grooves 29a1 and 29a2 enhances the water-resistant effect. Each drain groove (e.g., the drain groove 29a, 19a or 11a) can be made of more than two drain grooves.

Although the water-resistant structure according to the present invention has been described with reference to the above illustrated embodiments, in which the water-resistant structure according to the present invention has been applied to the zoom lens having two lens groups, the present invention is not limited solely to these particular embodiments and can be applied to any other type of lens barrel.

Operations of the (zoom) lens barrel 10 when the zoom ring (zoom rings 15 and 17) 30 is manually operated and operations of the (zoom) lens barrel 10 when the focus ring 19 is manually operated will be hereinafter discussed with reference to FIGS. 2 and 3.

[Focusing]

Upon the focus ring 19 being rotated, this rotation is transmitted to the rotatable advancing ring 27, thus causing the rotatable advancing ring 27 to rotate. The rotatable advancing ring 27 moves forward/rearward while rotating due to being connected with the linearly movable ring 25 (that is guided linearly in the optical axis direction) via a helicoid mechanism. Forward and rearward movements of the rotatable advancing ring 27 cause the first lens group support frame 29 to integrally move with the first lens group L1 forward and rearward along the optical axis O without rotating (see FIG. 2).

The gap between the focus ring 19 and the front zoom ring 17 is water-sealed by the flocked cloth 33. Therefore, the torque of the focus ring 19 acts on the zoom rings 15 and 17 (zoom ring 30) so as to rotate the zoom rings 15 and 17 via a frictional resistance caused between the front zoom ring 17 and the flocked cloth 33 (i.e., so as to generate rotational torque causing the zoom rings 15 and 17 to rotate). For this reason, in the present embodiment of the water-resistant structure, the frictional resistance (maximum amount of static friction/rotational torque produced by sliding friction) caused between the rear zoom ring 15 and the flocked cloth 35 that is bonded to the first stationary barrel 11 is set to be greater than the frictional resistance (maximum amount of static friction/rotational torque produced by sliding friction) caused between the front zoom ring 17 and the flocked cloth 33 that is bonded to the focus ring 19. Due to the difference between these frictional resistances (rotational torques), neither the rear zoom ring 15 nor the front zoom ring 17 follows the rotation of the focus ring 19 even if the focus ring 19 rotates.

[Zooming]

Upon the zoom rings 15 and 17, which are coupled together to integrally rotate as the single zoom ring 30, being rotated, i.e., upon the grip ring 16 being rotated, this rotation is transmitted to the cam ring 21, thus causing the cam ring 21 to rotate. This rotation of the cam ring 21 causes the linearly movable ring 25, which is connected with the cam ring 21 via a cam mechanism, to move forward/rearward without rotating. The rotatable advancing ring 27, which is connected with the linearly movable ring 25 via a helicoid mechanism, moves forward/rearward with the linearly movable ring 25 without rotating. Therefore, the first lens group support frame 29 and the first lens group L1 move forward/rearward with the rotatable advancing ring 27.

The gap between the front zoom ring 17 and the focus ring 19 is water-sealed by the flocked cloth 33. Therefore, the torque of the front zoom ring 17 acts on the focus ring 19 so as to rotate the focus ring 19 via a frictional resistance caused between the front zoom ring 17 and the flocked cloth 33. For this reason, in the present embodiment of the water-resistant structure, the frictional resistance (maximum amount of static friction/rotational torque produced by sliding friction) caused between the rotatable advancing ring 27 and the flocked cloth 37 that is bonded to the focus ring 19 is set to be greater than the frictional resistance (maximum amount of static friction/rotational torque produced by sliding friction) caused between the rear zoom ring 15 and the flocked cloth 33 that is bonded to the focus ring 19. Due to the difference between these frictional resistances (rotational torques), the focus ring 19 does not follow the rotation of either the zoom ring 30 even if the zoom ring 30 rotates.

According to the above described embodiment of the zoom lens barrel, the frictional resistance caused by the flocked cloth 33 that seals the gap between the focus ring 19 and the zoom lens ring 30 (the front zoom ring 17), which are manually independently rotated relative to each other, in a watertight fashion is set to be smaller than each of the frictional resistance caused by the flocked cloth 37 between the focus ring 19 and the rotatable advancing ring 27 and the frictional resistance caused by the flocked cloth 35 between the first stationary barrel 11 and the zoom lens ring 30 (the rear zoom ring 15). Accordingly, even if one of the focus ring 19 and the zoom ring 30 is manually rotated, the other does not follow this rotation.

In addition, in the present embodiment of the zoom lens barrel, the frictional resistance caused by the flocked cloth 33 can be easily adjusted to be small because the drain groove 19a, the flanges 19b and 19c and the overhang 17a are provided, in addition to the flocked cloth 33, as elements of a water-resistant structure for watertight seal between the front zoom ring 17 and the focus ring 19. Even if the contact pressure of the flocked cloth 33 with the front zoom ring 17 is adjusted to be small to thereby reduce the frictional resistance caused by the flocked cloth 33, a sufficient water-resistant effect is maintained by the drain groove 19a, the flanges 19b and 19c and the overhang 17a.

In addition, in the present embodiment of the zoom lens barrel, the drain grooves 11a, 19a and 29a can be formed to be mutually different in depth. Since the water-resistant performance can be varied by making the depths of the drain grooves 11a, 19a and 29a different from one another, a torque adjustment, e.g., an adjustment for reducing the frictional resistance of a sealing member by enhancing the water-resistant performance becomes possible. A similar effect can be obtained even by changing the number of the drain grooves.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A water-resistant structure of a lens barrel having at least two annular members which are concentrically arranged and relatively rotatable, said water-resistant structure comprising:

a sealing member that seals an annular gap between an inner annular member and an outer annular member of said annular members, wherein said sealing member is positioned in a vicinity of an open end of said outer annular member, in an axial direction thereof, and is fixed to one of said inner and outer annular members to be slidable on the other of said inner and outer annular members; and at least one drain groove formed on said inner annular member and positioned alongside said sealing member at a position closer to said open end of said outer annular member than said sealing member in an axial direction of said lens barrel.

2. The water-resistant structure according to claim 1, wherein a plurality of said drain grooves are provided at different positions, and wherein the depth of at least one of said plurality of drain grooves is different from the depth of another of said plurality of drain grooves.

3. The water-resistant structure according to claim 1, wherein said drain groove is defined between a plurality of flanges which project from an outer peripheral surface of said inner annular member.

4. The water-resistant structure according to claim 1, wherein said outer annular member comprises an overhang which overhangs said drain groove.

5. The water-resistant structure according to claim 4, wherein a surface of said overhang which faces said drain groove is inclined to widen a gap between said surface of said overhang and the bottom of said drain groove in a direction toward an end of said overhang.

6. The water-resistant structure according to claim 1, wherein said drain groove is formed so that an upper portion of said drain groove is smaller in depth than a lower portion of said driven groove when said lens barrel is in a normal position.

7. The water-resistant structure according to claim 1, wherein said sealing member is fixed to an outer peripheral surface of said inner annular member so as to be in slidable contact with an inner peripheral surface of said outer annular member.

8. The water-resistant structure according to claim 1, wherein said sealing member is an annular sealing member.

9. The water-resistant structure according to claim 1, wherein said sealing member comprises one of a flocked cloth material and a water-repellent material.

10. The water-resistant structure according to claim 1, wherein said outer annular member comprises one of a zoom ring and a focus ring.

11. The water-resistant structure according to claim 1, wherein said plurality of annular members comprise:

a plurality of manually-rotatable annular members which are independently relatively rotatable; and at least one secondary annular member to which said plurality of manually-rotatable annular members are relatively rotatable, wherein said water-resistant structure comprises:

a first sealing member which seals a gap defined between two of said plurality of manually-rotatable annular members, one of which is fitted on an outer side of the other, said first sealing member being positioned in a vicinity of an open end of the outer of said two manually-rotatable annular members; and a second sealing member which seals a gap defined between one of said plurality of manually-rotatable annular members and said secondary annular member, said second sealing member being positioned in a vicinity of an open end of the outer of said one of said plurality of manually-rotatable annular members and said secondary annular member, wherein a frictional resistance of said second sealing member which is produced between said secondary annular member and said one of said plurality of manually-rotatable annular members is greater than a frictional resistance of said first sealing member that urges one of said two manually-rotatable annular members to follow a rotation of the other of said two manually-rotatable annular members when said other of said two manually-rotatable annular members is rotated.

12. The water-resistant structure of claim 1, wherein the drain groove is formed on the outer circumferential surface of the inner annular member.

13. A water-resistant structure of a lens barrel having a plurality of annular members which are concentrically arranged, wherein said plurality of annular members comprise:

a plurality of manually-rotatable annular members which are independently relatively rotatable; and at least one secondary annular member to which said plurality of manually-rotatable annular members are relatively rotatable, wherein said water-resistant structure comprises:

a first sealing member which seals a gap defined between two of said plurality of manually-rotatable annular members, said gap extending in a radial direction of said plurality of manually-rotatable annular members relative to an axial direction of the lens barrel, one of said plurality of manually-rotatable annular members is fitted on an outer side of the other, said first sealing member being positioned in a vicinity of an open end of the outer of said two manually-rotatable annular members; and a second sealing member which seals a gap defined between one of said plurality of manually-rotatable annular members and said secondary annular member, said second sealing member being positioned in a vicinity of an open end of the outer of said one of said plurality of manually-rotatable annular members and said secondary annular member, wherein a frictional resistance of said second sealing member which is produced between said secondary annular member and said one of said plurality of manually-rotatable annular members is greater than a frictional resistance of said first sealing member that urges one of said two manually-rotatable annular members to follow a rotation of the other of said two manually-rotatable annular members when said other of said two manually-rotatable annular members is rotated.

14. The water-resistant structure according to claim 13, wherein said first sealing member is positioned between said two of said plurality of manually-rotatable annular members, which are independently relatively rotatable, wherein said second sealing member comprises at least two sealing members positioned between said secondary annular member and said plurality of manually-rotatable annular members, and wherein a frictional resistance of said first sealing member that is produced between said two of said plurality of manually-rotatable annular members is smaller than a frictional resistance of said second sealing member that is produced between said secondary annular member and said plurality of manually-rotatable annular members.

15. The water-resistant structure according to claim 13, wherein at least one drain groove is formed on an inner manually-rotatable annular member of said two of said plurality of manually-rotatable annular members, and wherein said drain groove is positioned alongside said first sealing member at a position closer to the outside of said inner manually-rotatable annular member than said first sealing member in an axial direction of said inner annular member.

16. The water-resistant structure according to claim 15, wherein said drain groove is formed between two flanges which project from an outer peripheral surface of said inner manually-rotatable annular member.

17. The water-resistant structure according to claim 15, wherein an outer manually-rotatable annular member of said two of said plurality of manually-rotatable annular members comprises an overhang which overhangs said drain groove.

* * * * *